Aug. 5, 1958          G. S. ALLIN, SR., ET AL          2,846,162
                            CABLE DRUM
                        Filed Sept. 12, 1955
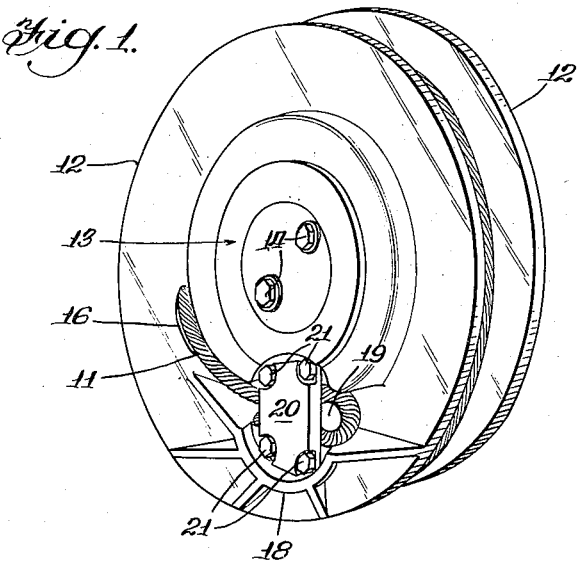
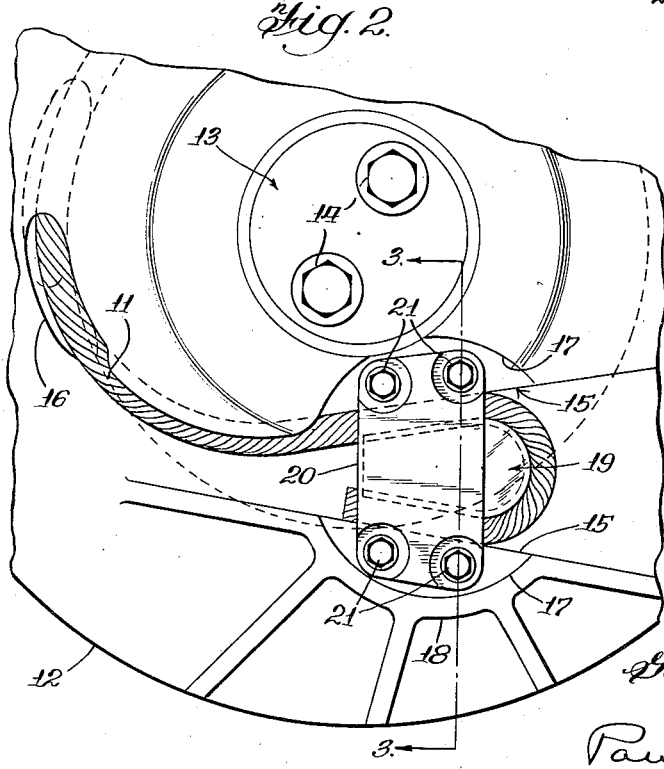
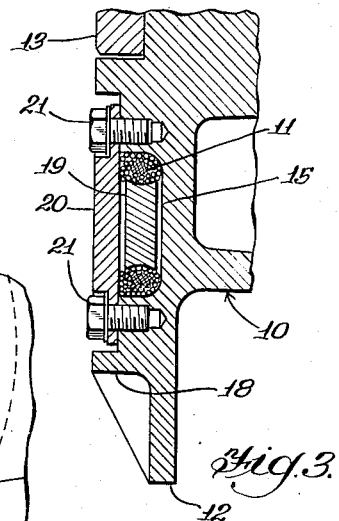
Inventors:
George S. Allin, Sr.
John K. Liu
Paul O. Pippel
Atty.

United States Patent Office 2,846,162
Patented Aug. 5, 1958

2,846,162

CABLE DRUM

George S. Allin, Sr., Flossmoor, and John K. Liu, Chicago, Ill., assignors to International Harvester Company, a corporation of New Jersey Application September 12, 1955, Serial No. 533,687

2 Claims. (Cl. 242—117)

This invention relates generally to cable drums, and more specifically, to an improved arrangement for securing a cable externally of a cable drum.

As is well known in the art, cable drums are usually rotatably mounted in cooperation with a power source under control of an operator so that the cable drum may be selectively rotated any amount in either direction to either wind on or wind off a cable from the cable drum. These cable drums are extensively used in the earthmoving equipment field wherein they are often mounted at either the forward or rearward end of a tractor to provide means by which an earth-working tool such as a bulldozer blade or scraper may be raised, lowered or controlled for proper operation. Because of the weight of this equipment, the cable used is generally of the stranded wire rope type in which the wires making up the rope are of a size to permit the lifting of relatively large weights. This results in a cable that is relatively inflexible and one that may not be sharply bent or twisted.

This relative inflexibility of the cable produces many problems in the use of the cable, especially in providing satisfactory means for securing the cable to the cable drum, and in removing the cable from the cable drum when replacement of the cable is necessary. A number of means have been developed in the art for anchoring the cable internally of the cable drum. These arrangements, while generally satisfactory for securing the cable on the drum, have been generally found unsatisfactory when a cable must be removed from the drum for placement of a new cable.

It is the object of the present invention to provide a cable drum including means for securing a cable thereto which overcomes the noted deficiencies of cable drums now used in the art.

It is a further object of this invention to provide a cable drum arrangement with means for anchoring a cable externally of the cable drum.

Other objects and the features of the present invention will be apparent upon a perusal of the following specification and drawing of which:

Figure 1 is a perspective view of a cable drum constructed according to the present invention;

Figure 2 is an enlarged front plan view of a portion of the cable drum shown in Figure 1, and Figure 3 is a cross sectional view of the structure shown in Figure 2 and taken along the line 3—3 of Figure 2.

The present embodiment is the preferred embodiment but it is to be understood that changes can be made in the present embodiment by one skilled in the art without departing from the spirit and scope of this invention.

For a detailed description of the present invention, reference is made to the drawing. The cable drum comprises a central hub portion 10 upon which the cable 11 is wound and a pair of flanges 12 between which the cable 11 is maintained. The cable drum comprising the hub portion 10 and the two flange portions 12 may be cast as one integral unit. The hub portion 10 is provided with an opening axially therethrough so that the cable drum may be fitted upon a suitable shaft (not shown) supplying the rotative power for the cable drum. The outer flange portion 12 is formed to have a circular depression at the center thereof and a circular plate 13 is formed to fit within that depression. A pair of bolts 14 are provided for mounting through the plate 13 and into tapped holes in the outer end of a shaft (not shown) for supplying rotative power to the cable drum.

To anchor the cable 11 externally of the cable drum the outer flange portion 12 is provided with a slotted portion 15 having walls generally convergent toward an oval opening 16 which is formed through the outer flange portion 12 substantially adjacent to the outer diameter of the hub portion 10. A substantially circular depression 17 is formed outwardly from the slotted portion 15. It is intended that the cable drum be cast with the slotted portion 15 and the circular depression 17 integrally formed thereon, and with the radially outward sections of the slotted portion 15 and the circular depression 17 being formed by a ribbed section 18, as can be seen in the drawings.

As shown in the drawings, it is intended that the present embodiment of the cable drum will rotate in a counter-clockwise direction, as viewed in Figures 1 and 2, to wind on the cable 11 and in an opposite direction to reel out the cable. The end of the cable 11 to be wound onto the drum portion 10 is projected through the oval opening 16 and into the slotted portion 15. A cable wedge 19 is also provided, and is formed to have the shape of a flat plate with two edges substantially conforming to the taper of the converging walls of slotted portion 15, and with these two edges blending with a circularly curved edge so that the cable 11 may be snubbed thereabout. The edge portions of the cable wedge 19 in contact with the cable are formed to have a groove with the radius of curvature thereof substantially equal to the radius of the cable 11. The cable wedge 19 has a thickness less than the nominal diameter of the cable 11. The end of the cable 11 is inserted between the formed edges of cable wedge 19 and the converging walls of the slotted portion 15, as can be seen in the drawings. The walls of the slotted portion 15 converge with a taper such that tension on the cable 11 tends to wedge the cable 11 between the edges of cable wedge 19 and the walls of the slotted portion 15. A plate 20 of sufficient width to partially cover the cable wedge 19 is provided. The corners of the plate 20 are reduced in thickness and have openings therethrough. Cap screws 21 are then mounted through the openings in the plate 20 and threaded into tapped holes within the circular depression 17. It may be noted that the plate 20 within the circular depression 17 provides a safe arrangement of these elements since no dangerous projections then extend outwardly from the cable drum. It can easily be seen that due to the converging walls the slotted portion 15 and the snubbing member 19, any pull on the cable 11 tends to tightly wedge the cable 11 about the cable wedge 19 and between the walls of the slotted portion 15.

To remove the cable 11 from the cable drum, cable wedge 19 is forced to the right as viewed in Figures 1 and 2, thereby releasing the pressure between cable wedge 19 and converging walls 15 on cable 11. In cases where the aforementioned procedure is not possible, such as with badly knotted or frayed cable, it is merely necessary to remove the cap screws 21 and the plate 20 and to then pry the cable wedge 19 from the slotted portion 15.

Having described the invention, what is considered new and desired to be protected by Letters Patent is:

1. In a cable drum having a pair of spaced apart flanges interconnected by a central hub portion, means for anchoring a cable externally of said drum comprising: an opening formed through one of said flanges of said cable drum for extending said cable externally of said drum, a snubbing member having the peripheral edge portions thereof shaped to substantially conform to the shape of said cable when the end portion of said cable is bent as a close loop and having a thickness less than the diameter of said cable, a slotted portion formed on the outer surface of said one of said flanges for receiving said snubbing member with said cable snubbed thereabout, said slotted portion having walls converging toward said opening whereby said snubbing member and said snubbed cable are wedged therewithin by any pull along the length of said cable toward said opening, and a clamping plate secured to said one of said flanges across said slotted portion and against said cable to clamp said snubbed cable within said slotted portion.

2. In a cable drum having a pair of spaced apart flanges interconnected by a central hub portion, means for anchoring a cable externally of said drum comprising: an oval opening formed through one of said flanges of said cable drum for extending said cable externally of said drum, a snubbing member having the peripheral edge portions thereof shaped to substantially conform to the shape of said cable when the end portion of said cable is bent as a close loop and having a thickness less than the diameter of said cable, said one of said flanges having a slotted portion and a depressed portion integrally formed thereon, said depressed portion positioned outwardly from said slotted portion and said slotted portion having walls converging toward said opening, said slotted portion adapted to receive said snubbing member and said snubbed cable therewithin so that said snubbing member and said snubbed cable are wedged between said walls by any pull along the length of said cable toward said opening, and a clamping plate removably secured across said slotted portion within said depressed portion and against said cable to clamp said snubbed cable within said slotted portion.

References Cited in the file of this patent

UNITED STATES PATENTS

| | | |
|---|---|---|
| 1,555,544 | Anthony | Sept. 29, 1925 |
| 2,193,407 | Hagen | Mar. 12, 1940 |
| 2,411,626 | Jaques | Nov. 26, 1946 |
| 2,535,318 | Ratcliffe | Dec. 26, 1950 |